United States Patent
McIlvaine et al.

[15] 3,685,261
[45] Aug. 22, 1972

[54] WET SCRUBBER FOR CONTAMINATED GAS

[72] Inventors: Robert L. McIlvaine, Glencoe; Roger E. Kent, Mount Prospect, both of Ill.

[73] Assignee: Environeering, Inc., Skokie, Ill.

[22] Filed: Feb. 16, 1971

[21] Appl. No.: 115,481

[52] U.S. Cl. ..................55/240, 55/257, 55/260, 261/DIG. 54
[51] Int. Cl. ............................................B01d 47/10
[58] Field of Search..261/DIG. 54; 55/227, 240, 241, 55/257, 260

[56] References Cited

UNITED STATES PATENTS

| | | |
|---|---|---|
| 2,277,670 | 3/1942 | Weisgerber..............55/241 X |
| 3,440,803 | 4/1969 | Wechselblatt............55/257 X |
| 3,456,709 | 7/1969 | Vegeby.....................55/257 X |

FOREIGN PATENTS OR APPLICATIONS

| | | |
|---|---|---|
| 647,174 | 11/1928 | France.......................55/241 |

*Primary Examiner*—Robert L. Lindsay, Jr.
*Attorney*—Mason, Kolehmainen, Rathburn & Wyss

[57] ABSTRACT

Wet scrubber apparatus for contaminated gas comprising flow passage means for said gas and means for introducing scrubbing liquid into the gas flow. A plurality of spaced-apart parallel liquid troughs are provided to extend transversely across the flow passage, and each of the troughs is concave in cross section for holding liquid. The underside of each trough defines a deflecting wall portion for a venturilike, convergent-divergent gas passage and a cover is spaced above each trough having an upwardly concave cross section with an upper surface also defining a wall portion of a venturilike gas passage. Adjacent pairs of troughs and their covers define convergent-divergent flow passages therebetween having minimum area throat sections adjacent the space between a trough and its cover. Liquid is introduced in the throat section from the trough into the high velocity gas flow by venturi suction.

6 Claims, 6 Drawing Figures

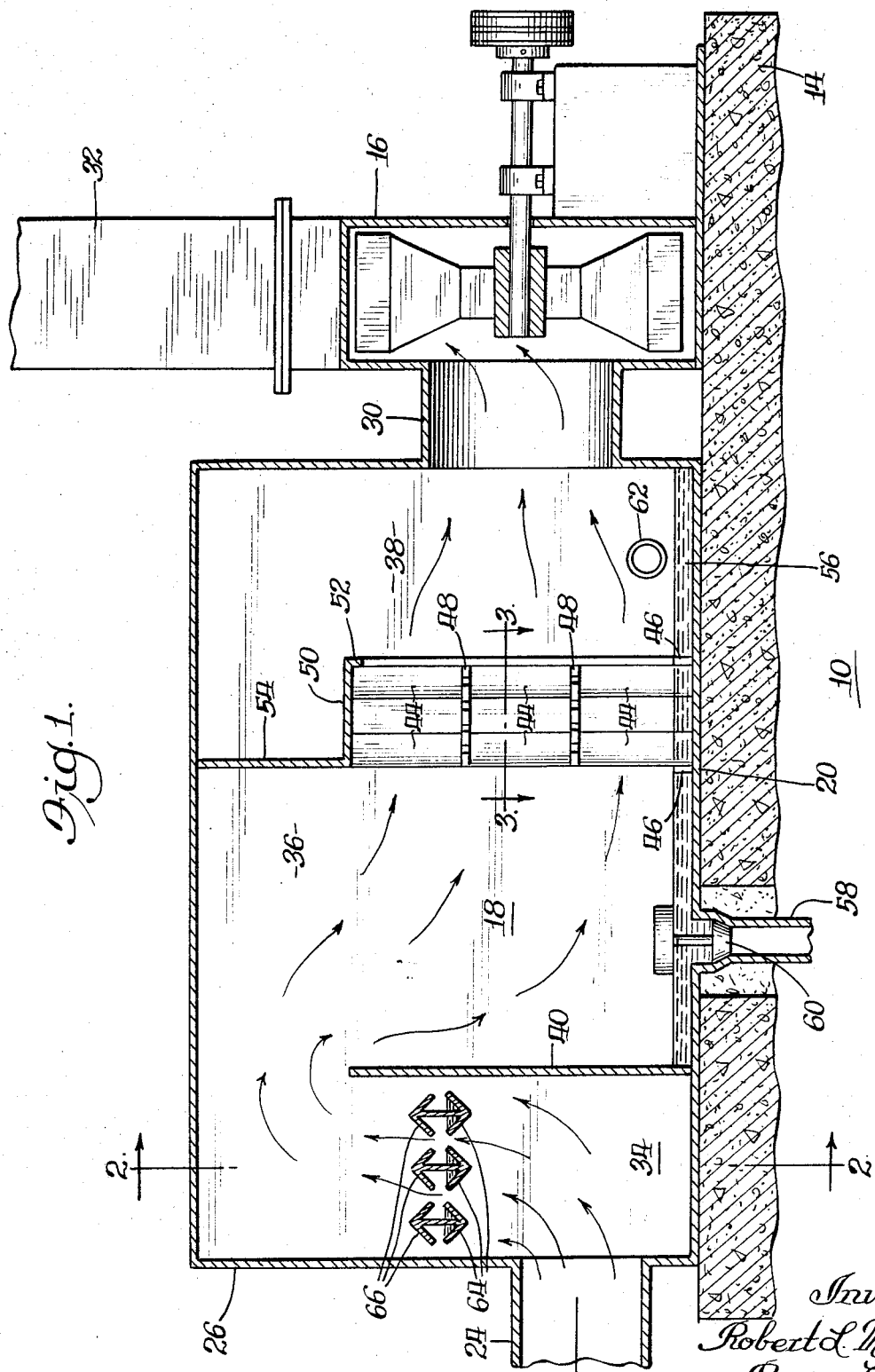

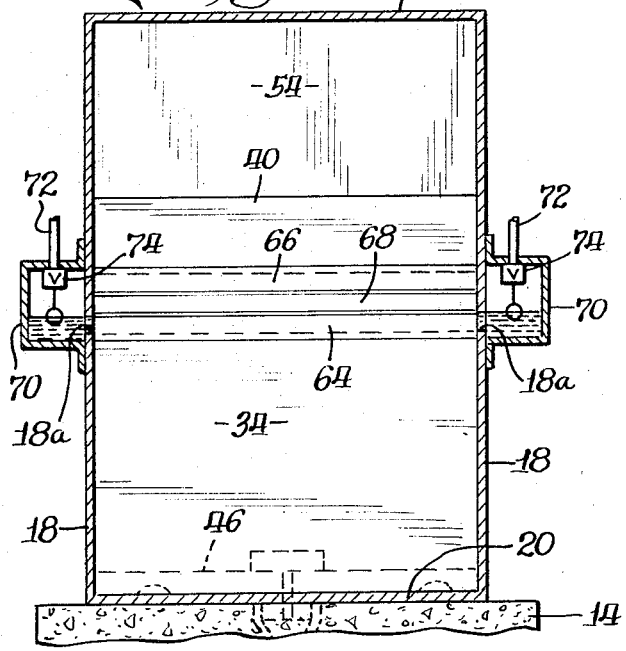
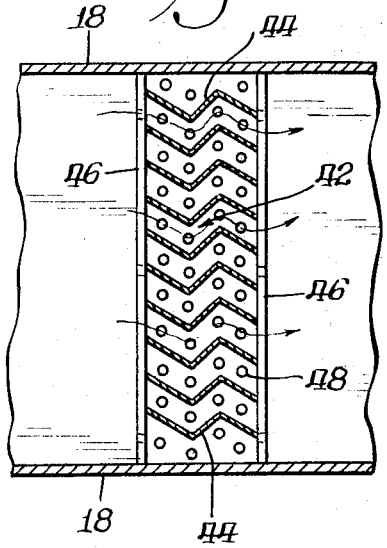
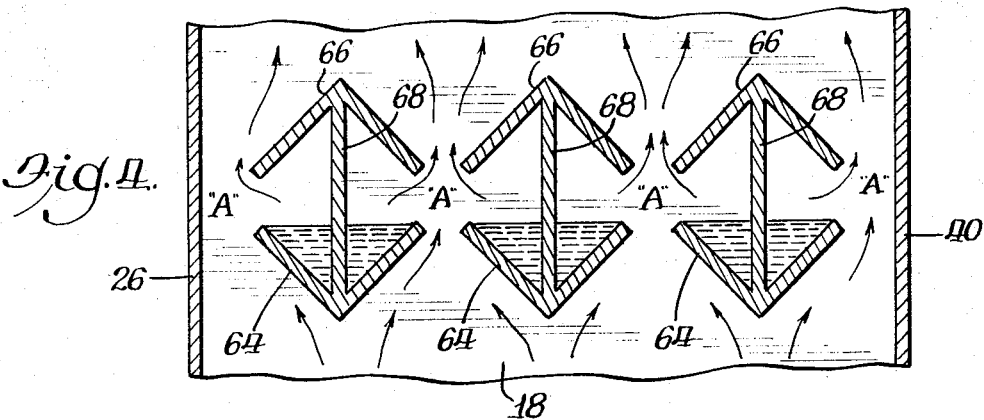
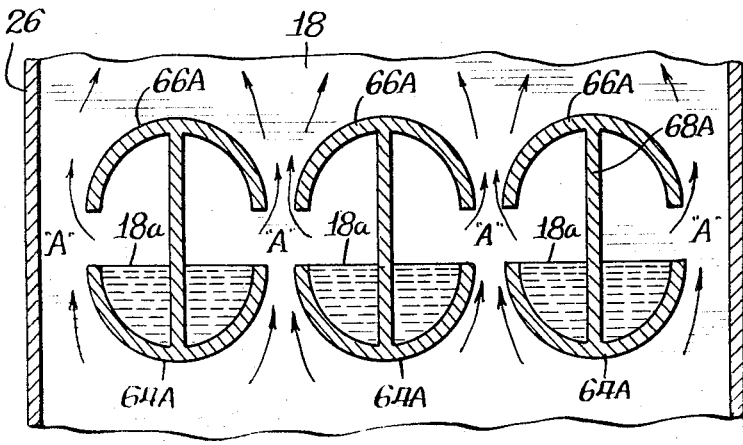

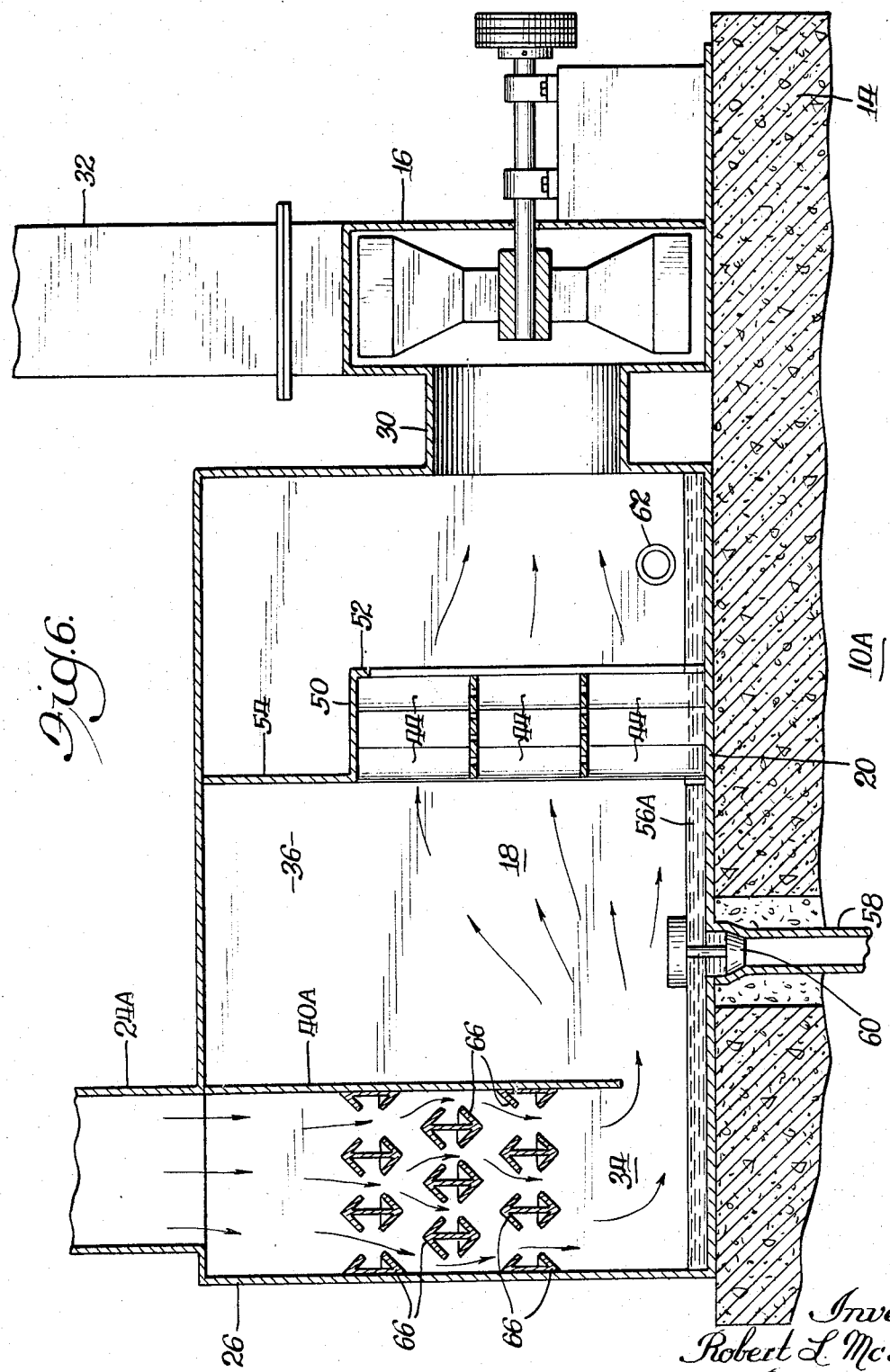

WET SCRUBBER FOR CONTAMINATED GAS

The present invention relates to gas scrubbers and, more particularly, to wet scrubbers of the gas-liquid contact type wherein a contaminant collecting scrubbing liquid is introduced into a high velocity gas flow for collection and removal of contaminant particles and fumes in the gas.

The present invention is an improvement of the wet-type gas scrubber shown and described in copending United States patent application Ser. No. 29,497, filed Apr. 17, 1970, and assigned to the same assignee as the present application.

It is an object of the present invention to provide a new and improved wet-type gas scrubber which is highly efficient in collecting and removing contaminant particles from industrial gases and the like.

More specifically, it is another object of the present invention to provide a new and improved scrubber of the character described employing novel means for introducing scrubbing liquid into the gas flow in order to achieve better dispersion and mixing of small liquid droplets with the gas, which is desirable to obtain high collection efficiencies of the smaller sized contaminant particles.

Another object of the present invention is to provide a new and improved gas scrubber of the character described employing a plurality of spaced-apart, liquid troughs for introducing liquid into the gas flow wherein the troughs themselves form deflecting wall surfaces defining portions of venturilike, convergent-divergent gas flow passages.

Another object of the present invention is to provide a new and improved gas scrubber of the character described wherein matching cover members are mounted above said liquid troughs, which cover members also define deflecting wall portions of convergent-divergent gas flow passages, said passages forming venturis for accelerating and decelerating the gas to draw liquid from the troughs into the high velocity flow region adjacent the area between a trough and its cover.

Another object of the present invention is to provide a new and improved gas scrubber of the character described which is capable of efficiently collecting and removing contaminants from the gas with minimum energy being required for operation and a minimum quantity of scrubbing liquid required per unit of gas volume.

Another object of the present invention is to provide a new and improved venturi-type gas scrubber of the character described which is highly efficient in removing a high percentage of contaminants in the gas, including particles ranging in size down to 10 microns and lower.

The foregoing and other objects and advantages of the present invention are accomplished in an illustrative embodiment comprising a wet scrubber having a housing defining a flow passage for contaminated gas and including means for introducing scrubbing liquid into the gas as it moves through the flow passage. Said means for introducing scrubbing liquid into the gas as it moves through the flow passage. Said means for introducing the scrubbing liquid includes a plurality of spaced-apart, parallel, liquid troughs extended transversely across the flow passage and each of the troughs has a concave cross section for holding a supply of liquid, and an underside which defines a deflecting wall surface of an adjacent venturilike, convergent-divergent gas flow passage. A matching cover is spaced above each trough having an upwardly convex cross section with an upper surface also defining a wall portion of an adjacent venturilike passage. Adjacent pairs of troughs and covers cooperate to define convergent-divergent gas flow passages therebetween having a minimum area throat or high velocity region adjacent the level between the troughs and their covers. Liquid from the troughs is drawn into the high velocity gas flow in the throats by venturi action to thoroughly mix and disperse in the gas to better agglomerate and collect contaminants therefrom.

For a further understanding of the invention, reference should be had to the following detailed description taken in conjunction with the drawings, in which:

FIG. 1 is a vertical, longitudinal, cross-sectional view of a new and improved scrubber constructed in accordance with the features of the present invention;

FIG. 2 is a transverse, vertical, cross-sectional view taken substantially along line 2—2 of FIG. 1;

FIG. 3 is a horizontal, fragmentary, cross-sectional view taken substantially along line 3—3 of FIG. 1;

FIG. 4 is an enlarged, fragmentary, vertical, cross-sectional view taken substantially along line 4—4 of FIG. 2 and illustrating somewhat schematically the gas flow and liquid introduction into the high velocity gas flow by venturi action;

FIG. 5 is similar to FIG. 4 and illustrates a modified form of vernturilike flow passages for accelerating and decelerating the gas and introducing liquid into the gas flow by venturi action; and FIG. 6 is a vertical sectional view through another embodiment of a wet scrubber constructed in accordance with the features of the present invention and similar to the scrubber of FIG. 1, but adapted for a downdraft entry of gas into the scrubber housing.

Referring now more particularly to the drawings, in FIGS. 1-4 is illustrated one embodiment of a new and improved wet-type gas scrubber constructed in accordance with the features of the present invention and referred to generally by the reference numeral 10. The scrubber 10 includes a rectangular housing 12 which may be mounted on a concrete base 14 along with a fan or blower 16 provided for moving the gases through the scrubber. The scrubber housing 12 includes a pair of rectangular opposite sidewalls 18, a bottom wall 20, and a top wall 22. Contaminated gas to be cleaned in the scrubber is introduced into the scrubber housing from a supply duct 24 connected to an opening defined adjacent the lower end of a front wall 26 of the scrubber housing. After the gases pass through the scrubber they are directed out of the housing through an opening in a rear wall 28 through an outlet duct 30 into the inlet side of the fan or blower 16. The clean gas is discharged or recirculated through a duct 32 connected to the outlet of the fan.

The scrubber housing 12 is divided into a venturi section or liquid introduction chamber 34 adjacent the front wall, an intermediate expansion chamber 36, and an exit chamber 38 at the rear end in communication with the outlet duct 30. An upstanding divider wall 40 is provided to separate the front chamber 34 from the expansion chamber 36 and, as shown by the arrows in FIG. 1, the contaminated gas from the inlet duct 24 is directed upwardly in a vertical direction through the flow passage or conduit defined by the front wall 26, the divider wall 40 and front portions of the housing sidewalls 18. The gas passes over the top edge of the divider wall 40 and then spills downwardly into the expansion chamber 36. The expansion chamber 36 is separated from the exit chamber 38 by means of a bank or array containing a plurality of demisting vanes and generally indicated as 42. The array of vanes 42 includes a large number of vertically extending, Z-shaped vanes 44 which are maintained in closely spaced-apart, upstanding, parallel relation to one another and are transversely across the housing in rows. The lower row of vanes is set between a pair of parallel retaining ribs 46, and each succeeding row of vanes is separated from the next adjacent lower row by a perforated plate 48. The top row of vanes is covered by a horizontal plate 50 having a downwardly depending retaining lip along the rearward edge 52 and a vertical divider wall 54 is provided between the upper plate 50 and the top wall 22 of the housing. Because the cross-sectional area available to the flowing gases in the expansion chamber 36 is substantially larger than the area measured transversely of the flow in the inlet chamber 34, the average velocity of the wetted gases is greatly reduced in the expansion chamber and the larger and heavier droplets of liquid gravitate out of the gas into a liquid collection sump indicated generally by the reference numeral 56. Most of the remaining finer droplets of liquid carried by the gas are removed by the demist vanes 44 which cause the gas to undergo abrupt changes in a direction and velocity. The droplets of liquid being heavier and having more inertia than the gas molecules, impinge and collect on the Z-shaped vertical vanes and collected liquid runs down the vanes into the liquid sump 56. A selected level of scrubbing liquid is maintained in the sump 56 in order to prevent the escape of gases out through a drainpipe 58, and a flow control valve 60 or other liquid sealing means may be provided for this purpose. When the contaminated liquid collecting in the sump beings to build up to higher levels, it permits the control valve 60 to open and the contaminant containing liquid is drained off through the line 58 to a settling or reclaiming tank or to the sewer. In the event additional makeup liquid is required to maintain a liquid seal and help to flush out the collected sediment in the sump, a liquid supply line 62 is provided and float or other control means is utilized to control the fresh liquid input from the supply line to the sump.

In accordance with the present invention, scrubbing liquid for collecting contaminants in the gas is introduced into the contaminated gas flow in the inlet section 34 by venturi action. For this purpose a plurality of downwardly concave liquid containing troughs 64 are mounted in a spaced-apart, horizontal, parallel array across the inlet section of the housing as best shown in enlarged detail in FIG. 4. The troughs 64 extend transversely of the general direction of gas flow and are supported at opposite ends from the sidewalls 18 of the housing. Suitable feed openings 18a are formed (FIG. 2) in direct alignment with liquid troughs, for supplying scrubbing liquid to fill the troughs from opposite ends to a desired level. Directly above and slightly spaced from the upper edges of each liquid trough 64 is provided a matching cover member 66 which has an upwardly convex cross section and, like the troughs 64, the covers may be conveniently formed of angle iron and supported at opposite ends by attachment to the housing sidewalls 18. Vertical divider plates 68 are provided to divide each trough and the dividers extend between the lower apex of the liquid troughs 64 to the upper apexes of the associated cover member 66. Each trough and cover is divided into two separate, laterally spaced compartments, and this prevents lateral or horizontal gas flow between adjacent troughs, which might otherwise occur because of slight differences in pressure.

As best shown in FIG. 4, the underside of each liquid trough 64 provides a gas deflecting wall surface which forms the inlet portion or convergent nozzle portion of a convergent-divergent, venturilike, flow passage. A plurality of venturilike flow passages are defined between adjacent sets of troughs and their covers and between the outer troughs and covers and the adjacent front wall 26 and divider wall 40. The top or upper surfaces of each cover member 66 form a divergent wall portion of a venturilike flow passage, and each trough and its associated cover cooperates with the next adjacent trough and cover or with the front wall 26 or divider wall 40 to provide a plurality of convergent-divergent, venturilike flow passages for accelerating and decelerating the gas. As the gas moves upwardly from the inlet duct 24, it is rapidly accelerated to a maximum velocity adjacent the upper edges of the troughs. This region provides a minimum flow area and defines a venturi throat, generally indicated by the letters "A" in FIG. 4. The pressure in the throat region of the venturi passages "A" between the upper edges of the troughs 64 and the lower edges of the respective covers 66 is at a minimum, and the velocity of the gas is at a maximum.

Liquid from the troughs is inducted into the high velocity flow of gas in the throat areas "A" by suction or venturi action and a thorough and intimate mixing or blending of small liquid droplets and gas molecules takes place. Moreover, some of the high velocity gas in the throat areas "A" strikes the lower edges of the cover member 66 and is deflected upwardly into the cover. This gas flow is highly turbulent above the liquid surface in the troughs and excellent mixing action occurs in this region. Because of the highly turbulent, intense mixing action between minute liquid droplets and the gas in the throats of the venturi passages, excellent transfer of the contaminants from the gas to the liquid takes place and the contaminants agglomerate and collect in the liquid droplets.

A continuous supply of liquid is provided for the liquid troughs 64 from opposite ends of plenum chambers 70 (FIG. 2) which are in communication with the feed openings 18a in the housing sidewalls. Liquid is introduced into the plenum chambers 70 through liquid feed lines 72 and control valves 74 are provided to maintain a desired upper level of liquid in the plenum chambers and trough so that excess liquid is not supplied. The liquid level can be selectively adjusted so that the right amount of liquid is furnished and no waste occurs by spillage over the edges of the troughs. In this manner, the liquid supply is controlled so that liquid is supplied only as fast as it can be picked up by the gas. The liquid supplied may comprise fresh water or may be recirculated water obtained from a settling tank system wherein the liquid is recirculated over and over again after the sludge and contaminant particles have been removed therefrom.

The liquid troughs 64 and their covers 66 perform dual services in functioning as the means forming the wall portions which define the convergent-divergent venturi flow passages and in supplying and scrubbing liquid to the throat region of these venturi passages for pickup in the gas by venturi action.

In FIG. 5 is illustrated a modified form of liquid troughs 64A and covers 66A forming venturi passages. The troughs 64A are made from conventional round pipe, as are the covers 66A, and each trough and cover can be fabricated by splitting a pipe length in half longitudinally thereof. A vertical spacer 68A, slightly larger than the internal diameter of the original pipe is used to achieve a desired spacing distance between the lower edges of the covers 66A and the upper edges of the troughs 64A. Similarly, in the previous embodiment, the desired spacing between the facing edges of the troughs 64 and their covers 66 is set up by the height of the dividers 68. The rounded undersurface of the troughs 64A and the upper surfaces of the covers 66A provide somewhat more abrupt initial outward deflection and final reconvergence of the gases as they pass through the convergent-divergent venturi passages.

Referring to FIG. 6, therein is illustrated a modified form of wet-type scrubber 10A constructed in accordance with the features of the present invention. In the scrubber 10A the contaminated gas to be cleaned is introduced in downward flow through a vertical duct 24A in communication with an opening provided in the top wall 22 of the scrubber housing. The inlet chamber section 34 is separated from the intermediate chamber 36 via a divider wall 40A which extends downwardly from the top wall 22 and has a lower edge spaced above the bottom wall 20 of the scrubber housing. Except for the downdraft flow pattern, as described, the scrubber 10A is substantially similar to the scrubber 10 previously described, and venturi forming troughs and covers like those of FIG. 5 may be used instead of the angular troughs 64 and 66, as illustrated.

While there have been illustrated and described several embodiments of the present invention, it will be appreciated that numerous changes and modifications will occur to those skilled in the art and it is intended in the appended claims to cover all those changes and modifications which fall within the true spirit and scope of the present invention.

What is claimed as new and desired to be secured by Letters Patent of the United States is:

1. A wet scrubber for contaminated gas comprising conduit means including wall means for directing and containing a flow of contaminants in a generally vertical direction, means for moving gas through said conduit means, means for introducing scrubbing liquid into said gas flow in said conduit means under venturi action of said gas comprising a plurality of spaced-apart, parallel, horizontal liquid troughs extending transversely across and dividing said conduit means into a plurality of spaced-apart, separate, venturilike flow passages for high velocity gas flow, each of said troughs having a concave cross section for holding liquid therein and an underside defining lower wall portions of at least one of said passages, a cover member spaced above each of said liquid troughs in covering relation over the liquid therein and having an upwardly convex cross section and an upper surface defining an upper wall portion of at least one of said flow passages, each trough and cover thereabove defining at least one convergent-divergent sidewall of at least one of said venturilike flow passages and forming a minimum area venturi throat adjacent the upper edge of said trough, said liquid in said trough flowing laterally outward over the upper edge of said trough in response to the suction produced by venturi flow of the gas in the adjacent flow passage, means for supplying scrubbing liquid through the ends of said troughs and means for removing scrubbing liquid from said gas downstream of said flow passages.

2. The scrubber of claim 1 including vertical divider means extended between each trough and the cover thereabove for eliminating transverse gas flow between the throats of adjacent flow passages.

3. The scrubber of claim 1 wherein said covers and troughs are formed of angular cross section with the apexes of each trough and cover thereabove on a common vertical plane.

4. The scrubber of claim 1 wherein said covers and troughs are formed of cylindrical segments.

5. The scrubber of claim 1 including means for supplying liquid from opposite ends of said troughs.

6. The scrubber of claim 1 including control means for regulating the level of liquid in said troughs.

* * * * *